United States Patent
Beyer, Jr.

(10) Patent No.: US 8,131,298 B1
(45) Date of Patent: Mar. 6, 2012

(54) METHOD OF PROVIDING A CELLULAR PHONE/PDA COMMUNICATION SYSTEM

(75) Inventor: Malcolm K. Beyer, Jr., Jupiter Inlet Colony, FL (US)

(73) Assignee: Advanced Ground Information Systems, Inc., Jupiter, FL (US)

( * ) Notice: Subject to any disclaimer, the term of this patent is extended or adjusted under 35 U.S.C. 154(b) by 0 days.

(21) Appl. No.: 12/631,319

(22) Filed: Dec. 4, 2009

(51) Int. Cl.
*H04W 36/00* (2009.01)

(52) U.S. Cl. ........ 455/437; 455/417; 455/436; 455/438; 455/439; 455/445; 370/331; 370/332

(58) Field of Classification Search .................. 455/415, 455/416, 417, 418, 419, 420, 436, 437, 438, 455/439, 445; 370/331, 332
See application file for complete search history.

(56) References Cited

U.S. PATENT DOCUMENTS

| | | | |
|---|---|---|---|
| 6,868,337 B2 * | 3/2005 | Muramatsu | 701/211 |
| 2002/0105957 A1 * | 8/2002 | Bondarenko et al. | 370/401 |
| 2002/0139150 A1 | 10/2002 | Yokoyama et al. | |
| 2004/0192331 A1 * | 9/2004 | Gorday et al. | 455/456.1 |

\* cited by examiner

*Primary Examiner* — Nick Corsaro
*Assistant Examiner* — Amanuel Lebassi
(74) *Attorney, Agent, or Firm* — Malin Hakey DiMaggio Bowen & Lhota, P.A.

(57) ABSTRACT

A cellular, PDA communication device and communication system for allowing a plurality of cellular phone users to monitor each others' locations and status, to initiate cellular phone calls by touching a symbol on the touch screen display with a stylus which can also include point to call conferencing calling. Each participant's cellular phone PDA device includes GPS navigation receiver with application software for point to call cellular phone initiation to participants and geographical entities including vehicles, persons or events, conference calls and video transfers. The method and system also includes automatic shifting from GPRS/EDGE/CDMA/1XEVDO to SMS when any of the cellular phones in the communication network is in the voice mode and in use and for automatic shifting back to GPRS/EDGE/CDMA/1XE-VDO upon completion of the voice phone call. In addition, using the system, a full transfer of photographs, video clips and high speed data can be used between any cellular phones regardless of who the cellular phone vendors or cellular phone companies are and in either CDMA, GSM, WiFi or a combination of the two.

7 Claims, 6 Drawing Sheets

METHOD OF PROVIDING A CELLULAR PHONE/PDA COMMUNICATION SYSTEM

BACKGROUND OF THE INVENTION

1. Field of the Invention

This invention relates generally to an integrated communications system using a plurality of cellular/PDA/GPS phones for the management of a group of people through the use of a communications net and, specifically, to provide each user with a cellular/PDA/GPS/phone that has software application programs and databases that permit all the users to continuously know each other's locations and status, to rapidly call and communicate voice, high speed internet data, photographs and video clips among the users by touching display screen symbols and to enable the users to easily access data concerning other users and other database information.

2. Description of Related Art

The purpose of a communications system is to transmit information bearing signals from a source, located at one point, to a user destination, located at another point some distance away. A communications system is generally comprised of three basic elements: transmitter, information channel and receiver. One form of communication in recent years is cellular phone telephony. A network of cellular communication systems set up around an area such as the United States allows multiple users to talk to each other, either on individual calls or on group calls. Some cellular phone services enable a cellular phone to engage in conference calls with a small number of users. Furthermore, cellular conference calls can be established through 800 number services. Cellular telephony also now includes systems that include Global Positioning System (GPS) navigation that utilizes satellite navigation. These devices thus unite cellular phone technology with navigation information, computer information transmission and receipt of data.

Digital Smart Message Service (SMS) and TCP/IP messages can be transmitted using cellular technology such as various versions of GSM and CDMA or via a WiFi local area network. One implementation of these GPS location reporting cellular systems is for the data to go to a remote central site where the information is displayed for a person to monitor the locations of the cellular units that have the combined cellular GPS phone. Another implementation permits the cellular phone users to also view the location of other GPS equipped units. A drawback of the current implementation is that these systems are either all on or all off. There is no way to selectively activate participants or to stop the participants from participating in the network or for participants to set their reporting intervals that is based on time or distance traveled. The use of the current combined cellular phone/PDA technology has drawbacks when calling. When an operator makes a cellular phone call using the PDA to display a map (that also may depict geo-referenced businesses, homes and other facilities' locations and phone numbers), the cellular phone/PDA operator is required to display the numeric phone number by touching the display screen at the correct location of that entity on the map, memorize the numeric phone number, and select a different display to physically enter the phone number to make the call and then, if desired, go back to the map display. Needless to say, this is a cumbersome process. Sending a text message or an email to a location, business, home or facility that appears on a PDA map display or to another cellular phone can also be a cumbersome process as the PDA operator has to find the phone number or email address of the location on the map display, memorize the phone number or email address, then go to a different display to enter a text message, enter the text message, send the text message and then shift back to the map display program. Furthermore, for a phone to send data concerning a new entity of interest, not currently on the geo-referenced map display (car, person, tank, accident, or other entity), the operator must type in the information and the latitude and longitude of the new entity of interest.

U.S. Patent Application No. 2003/0139150 published Jul. 24, 2003 shows a portable navigation and communication system. In one embodiment, the system combines within a single enclosure a GPS satellite positioning unit, mobile telephony using cellular phone technology and personal computing capable of wired or wireless internet or intranet access using a standard operating system. The purpose of this invention is to provide portable navigation for an individual. However, to operate the device, one still needs to utilize a keypad with the telephone functions. U.S. Patent Application No. 2003/0139150 described a wireless communication system operating the PDA in a conventional manner. There is no provision for displaying the location of other similarly equipped systems. There is no provision to cause other similarly equipped cellular phone/PDA users to transmit their locations. There is no provision for entering other entities of interest by touching the display screen at their locations on a map. There is no provision for making a telephone call by touching the display screen at a net participant's symbol or entered facility (police station, fire station, etc.) symbol to initiate automatically the telephone call to that user or by touching multiple symbols to make conference calls. There is no provision for sending text messages, photographs or videos by touching the net participant(s)' symbol(s) on the display screen to automatically send text messages, photographs or videos to that participant or participants. There is no provision to go to a facility's web site or to automatically fill in a facility's E-mail address. There is no description or disclosure of a procedure to cause digital messages to be sent to a remote cellular phone that would cause the cellular phone to make verbal announcements, increase sound intensity, vibrate or to call back or to call another phone number. There is no description of the uses of layered soft switches which confine the switches to a particular vicinity of the PDA's display screen.

SUMMARY OF THE INVENTION

A plurality of cellular phone/WiFi/PDA/GPS devices each having application software and databases to provide a communication network having: a) the ability to selectively poll each of the other PDA/GPS phone devices with each participant to start reporting its position and status information directly to all or selected users equipped with the same cellular phone/PDA communication/GPS devices in the communications net so that each of the devices that the data is transmitted to is provided a display of the location, status and other information of the other users; b) the ability of each of the cellular phone/PDA devices to report to another device at an operator selected time rate or at a rate based on distance traveled; c) the ability to exchange other entities' of interest information and to assign these entities a category (car, person, tank, accident, or other event) by touching the display screen at the entity's location on the displayed map, and selecting the appropriate category switch; d) the ability to make rapid voice and data call initiation to any other participant in the cellular phone/WiFi net whose phone number is available in a geo-referenced database including the cellular phone/PDA/GPS devices in a communications net by touching the display screen at the appropriate map location on the PDA map display and selecting a call switch; e) the ability to make rapid voice, and conference call initiation to locations, businesses, homes and facilities whose phone numbers are available in a geo-referenced database including the cellular phone/PDA/GPS devices in a communications net by touching the display screen at the appropriate other user locations on the PDA map display and selecting a conference call switch; f) the ability to access a facility's URL or to automatically fill in their E-mail address; g) the ability to remotely control from one cellular phone/PDA/GPS any of the other cellular phone/PDA/GPS systems phones including the ability to control remote cellular phones to make verbal prerecorded announcements, place return calls, place calls to another phone number, vibrate, execute text to speech software, change sound intensity, remotely control software and functions resident on the remote phone and process and display information by touching the display screen at their location on the PDA display and selecting the appropriate switch; and g) the ability to layer a sufficient number of switches or buttons on the PDA display to perform the above functions without overlaying the map.

It is an object of this invention to provide an improved cellular telephone communication network among a plurality of cellular phones for greatly decreasing the operator actions necessary to establish calling and conferencing between each of the cellular phones.

And yet another object of this invention is to enable each participant to automatically exchange IP addresses using SMS or another digital message format.

And yet another object of this invention is to enable each participant in the communications net to poll the other net participants to report or cease reporting their locations, identity and status on the communication net.

And yet another object of this invention is to enable each participant in the communications net to be able to easily transmit an entity of interest to the other participants of the net by touching the display screen at the entity's location on the map and causing a symbol to be generated on the screen and entered and then entering the entity's category information.

And yet another object of this invention is to provide for initiating a cellular phone telephone call to another phone by touching the other phone's symbol on the screen of the cellular phone, which automatically activates the telephone call.

And yet another object of this invention is to provide a cellular phone network that provides for instant voice conference calling and the exchange of free text, preformatted messages, photographs and video among a plurality of cellular phones by touching the display screen of specific geo-referenced map symbols for initiating the calls.

And yet another object of this invention is to provide a cellular phone network that provides for instant conference voice, text, photographs and video exchange by pre-establishing conferencing sub-nets and the subsequent activation of one of those sub-nets to establish a conference call.

But yet still another object of the invention is to provide for a communication system that uses cellular telephone network that allows for photographs and video clips to be transferred ("pushed") between and among the cellular phone users across multiple cellular carriers, between smart phone and PCs.

In accordance with these and other objects which will become apparent hereinafter, the instant invention will now be described with particular reference to the accompanying drawings.

PREFERRED EMBODIMENT OF THE INVENTION

Figure 1:
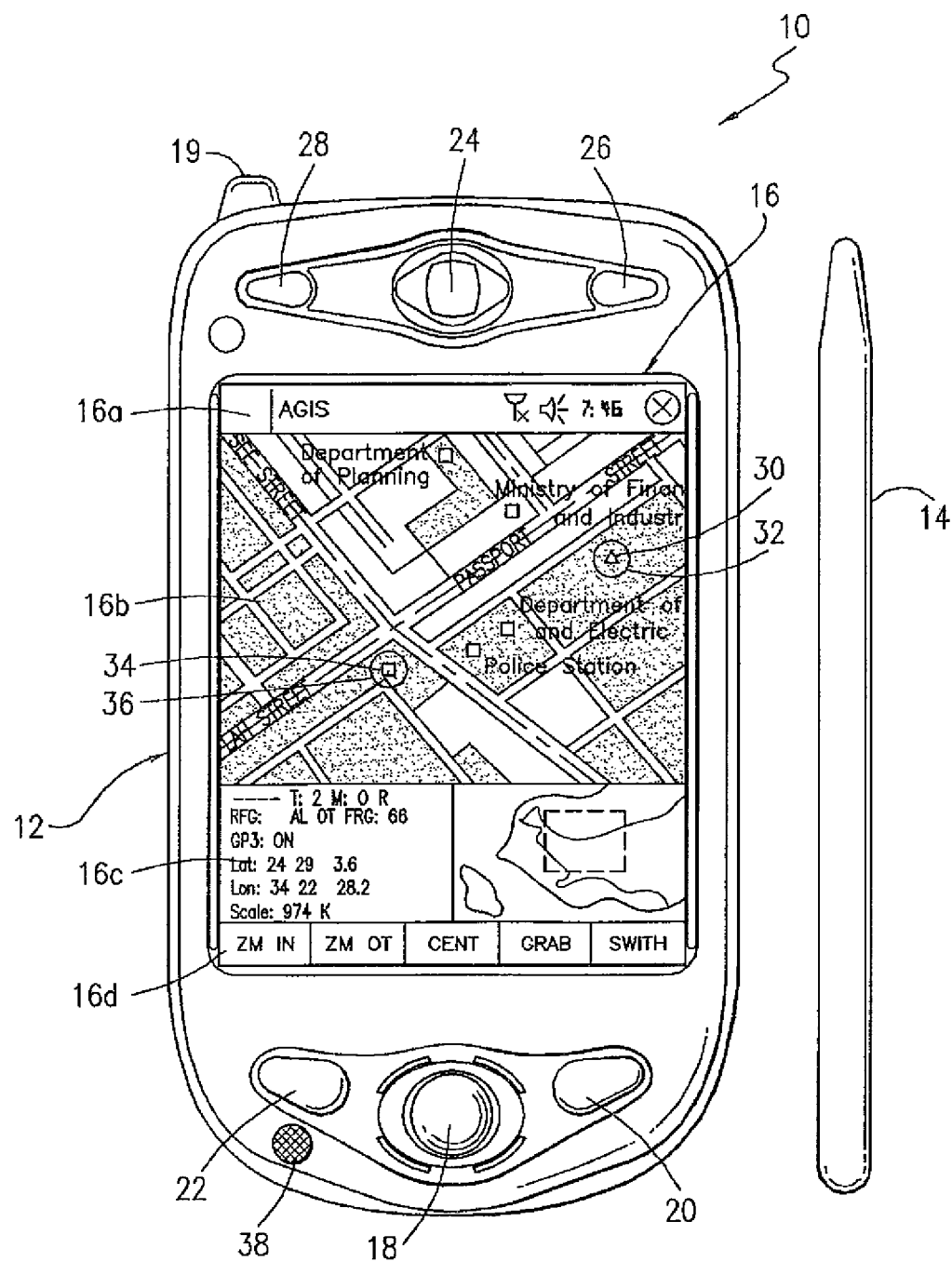
FIG. 1 shows a front plan view of a cellular phone/PDA having a touch screen display in accordance with the present invention.

Referring now to the drawings and, in particular, FIG. 1, the present invention is shown generally at 10 that includes a small handheld cellular phone that includes a personal digital assistant (PDA) and a global positioning system receiver (GPS) communications device in housing 12 that includes an on/off power switch 19, a microphone 38, and an LCD display 16 that is also a touch screen system. The small area 16a is the navigation bar that depicts the telephone, GPS and other status data and the active software. AGIS software refers to the application software used in this invention. AGIS is a trademark of AGIS Corporation. Each cell phone includes a CPU and databases that store information useful in the communication network. The CPU also includes a symbol generator for creating touch screen display symbols discussed herein. With the touch screen 16, the screen symbols are entered through GPS inputs or by the operator using a stylus 14 (or operator finger) by manipulatively directing the stylus 14 to literally touch display 16. The soft switches 16d displayed on the display 16 are likewise activated by using a stylus 14 and physically and manipulatively directing the stylus to literally touch display 16. The display x, y coordinates of the touched point are known by a CPU in the PDA section of the communication system in housing 12 that can coordinate various information contained in the PDA portion relative to the x, y coordinate position on the display 16. Inside housing 12 is contained the conventional cellular phone elements including a modem, a CPU for use with a PDA and associated circuitry connected to speaker 24 and microphone 38. A GPS navigational receiver that receives signals from satellites that can determine the latitude and longitude of the cellular phone housing 12 can be internal or external to the housing 12. PDA/cellular phone units such as these are currently on sale and sold as a complete unit (or with an external connected GPS) that can be used for cellular telephone calls and sending cellular SMS and TCP/IP or other messages using the PDA's display 16 and computer (CPU). The GPS system including a receiver in housing 12 is capable of determining the latitude and longitude and through SMS, TCP/IP, WiFi or other digital messaging software, to also transmit this latitude and longitude information of housing 12 to other cellular phones in the communication network via cellular communications, WiFi or radio. The device 10 includes a pair of cellular phone hardware activating buttons 20 to turn the cellular phone on and 22 to turn the cellular phone off. Navigation pad actuator 18 is similar to a joy or force stick in that the actuator 18 manually provides movement commands that can be used by the PDA's software to move a cursor on display 16. Switches 26 and 28 are designed to quickly select an operator specified software program. Speaker 24 and microphone 38 are used for audio messages. Switch 19 at the top left of device 10 is the power on and power off switch for the entire device.

The heart of the invention lies in the AGIS software applications provided in the device. Mounted within housing 12 as part of the PDA is the display 16 and the CPU. The internal CPU includes databases that provide for a geographical map and georeferenced entities that is shown as display portion 16b that includes as part of the display various areas of interest in the particular local map section.

When looking at display 16, the software switches (soft switches) which appear at the very bottom of the display 16d are used to control by touch many of the software driven functions of the cellular phone and PDA. The software drawn and controlled switches are activated through the operator's use of the navigation pad 18, or a small track ball, force stick or similar hardware display cursor pointing device. Alternatively, the operator may choose to activate the software switch matrix by touching the screen with a stylus 14 (or finger) at the switches' 16d locations. When some of the software switches are activated, different software switches appear. The bar display 16d shows the software switches "ZM IN (zoom in)," "ZM OT (zoom out)," "CENT (center)" and "GRAB (pan/grab)" at the bottom of the screen. These software switches are for the operator to perform these functions. The "SWITH (switch)" software switch at the lower right causes a matrix of layered software switches (soft switches) to appear above the bottom row of switches. Through use of the software switches, the operator can also manipulate the geographical map 16b or chart display. When looking at FIG. 1, permanent geographical locations and buildings are shown. For example, the police station is shown and when the symbol is touched by the stylus or finger, the latitude and longitude of the symbol's location, as shown in display section 16c, is displayed at the bottom left of the screen. The bottom right side of display 16c is a multifunction inset area that can contain a variety of information including: a) a list of the communication link participants; b) a list of received messages; c) a map, aerial photograph or satellite image with an indication of the zoom and off set location of the main map display, which is indicated by a square that depicts the area actually displayed in the main geographical screen 16b; d) applicable status information; and e) a list of the communication net participants. Each participant user would have a device 10 shown in FIG. 1.

Also shown on the display screen 16, specifically the geographical display 16b, is a pair of different looking symbols 30 and 34, a small triangle and a small square, which are not labeled. These symbols 30 and 34 can represent communication net participants having cellular phones in the displayed geographical area that are part of the overall cellular phone communications net having the same device 10 used in this invention. The latitude and longitude of symbol 30 is associated within a database along with a specific phone number and, if available, its IP address and email address. The screen display 16b, which is a touch screen, provides x and y coordinates of the screen 16b to the CPU's software from a map in a geographical database. The software has an algorithm that relates the x and y coordinates to latitude and longitude and can access a communications net participant's symbol or a fixed or movable entity's symbol as being the one closest to that point.

For describing the network, the operator's phone is cellular phone "one." In order to initiate a telephone call to the cellular phone user (communication net participant) represented by symbol (triangle) 30 at a specific latitude and longitude display on chart 16b, the operator touches the triangle 30 symbol with the stylus 14. The operator then touches a "call" software switch from a matrix of displayed soft switches that would overlay the display area 16c. Immediately, the cellular phone will initiate a cellular telephone call to the cellular phone user at the geographical location shown that represents symbol 30. A second cellular phone user (communication net participant) is represented by symbol 34 which is a small square (but could be any shape or icon) to represent an individual cellular phone device in the display area. The ring 32 around symbol 30 indicates that the symbol 30 has been touched and that a telephone call can be initiated by touching the soft switch that says "call." When this is done, the telephone call is initiated. Other types of symbolic elements on the display 16 can indicate that a cellular phone call is in effect. Additionally, the operator can touch both symbol 34 and symbol 30 and can activate a conference call between the two cellular phones and users represented by symbols 30 and 34. Again, a symbolic ring around symbol 34 indicates that a call has been initiated.

Equally important, the operator of cellular phone "one" can call the police station or any other specific geographical facility displayed on the map, including: (buildings, locations of people, vehicles, facilities, restaurants, etc., (whose cellular phone numbers and, if available, E-mail addresses, IP addresses and their URLs were previously stored in the database) by touching a specific facility location on the map display using the stylus 14 and then touching the cellular phone call switch. As an example, the operator can touch and point to call a restaurant using a soft switch by touching the restaurant location with his stylus and then touching the call soft switch. The cellular phone will then call the restaurant. Thus, using the present invention, each participant can touch and point to call to one or more other net participants symbolically displayed on the map each of whom have a device as shown in FIG. 1 and can also point to call facilities that had been previously stored in the phone's database. Furthermore, this symbol hooking and soft switch technique can be used to go to a fixed facility's website or to automatically enter the fixed facility's E-mail address in an e-mail.

Each cellular phone/PDA/GPS user device is identified on the map display of the other participant user phone devices by a display symbol that is generated on each user phone display to indicate each user's identity. Each symbol is placed at the correct geographical location on the user display and is correlated with the map on the display. The operator of each cellular phone/PDA/GPS device may also enter one or more other fixed entities (buildings, facilities, restaurants, police stations, etc. and geo-referenced events such as fires, accidents, etc.) into its database. This information can be likewise transmitted to all the other participants on the communications net. The map, fixed entities, events and cellular phone/PDA/GPS device communication net participants' latitude and longitude information is related to the "x" and "y" location on the touch screen display map by a mathematical correlation algorithm.

When the cellular phone/PDA/GPS device user uses a stylus or finger to touch one or more of the symbols or a location displayed on the cellular phone map display, the system's software causes the status and latitude and longitude information concerning that symbol or location to be displayed. In order to hook a symbol or "track" such as another net participant which represents an entity on the geo-referenced map display, or a fixed geographical entity such as a restaurant, police station or a new entity observed by a cell phone user which is discussed below, the operator points at or near the location of a geo-referenced symbol appearing on the cellular phone/PDA display that represents a specific track or specific participant or other entity. The hook application software determines that the stylus is pointed close to or at the location of the symbol and puts a circle, square or other indication around the symbol indicating that amplification information concerning the track is to be displayed and indicating that additional data or change in data can be made to the indicated symbol. The hook application code then sends a message to the display application code to display the net participant, facility or entity's amplifying data. The display application code retrieves the primary data and amplification data concerning the track or entity from the database and displays the information at the correct screen location. The operator can then read the amplification data that relates to that specific symbol at the specific location. The cell phone operator can also select soft switches on the touch screen display to change the primary data and amplification data or to take actions which could include making cellular phone calls, conference calls, 800 number calls, sending a free text message, operator selected preformatted messages, photographs or videos to the hooked symbol or to drop the symbol.

Each known net participant has a cellular phone number, IP address and, if available, E-mail address that is stored in each participant's device database.

To use the present invention, the operator ("cellular phone one" or "phone one") starts the PDA/cellular phone device system by selecting the software which causes: a) the cellular phone to be activated (if it has not already been activated), b) the GPS interface receiver to be established, c) a map of the geographic area where the operator is located and operator's own unit symbol to appear at the correct latitude and longitude on the map on the display, d) the locations of fixed facilities such as restaurants, hotels, fire departments, police stations, and military barracks, that are part of the database to appear as symbols on the map, e) the device selected item read out area (which provides amplification information for the communications net participant or object that has been touched on the display screen) to appear on the display, f) an insert area that contains various data including: the list of net participants, a list of messages to be read, an indication of what portion of the map is being displayed in major area and other information to appear on the display, and g) a row of primary software created "soft switches" that are always present on the display to appear.

For point to call network units and fixed facilities, the application code detects the x, y display screen location of the symbol that is designated by the user's stylus and translates the x, y coordinates to latitude and longitude and then: (1) searches the database to find the symbol at that location, (2) places a "hook" indicator (a circle, square or other shape) around the symbol, (3) displays any amplifying data and (4) obtains the symbol's associated phone number (or for VoIP calls and IP address) from the database. Upon receiving a "call" designation from the soft switch, the operator's device application code causes the appropriate phone number or IP number to be called. Upon receiving an indication that the phone number is being called, the application code places a box around the symbol (color, dashed or the like). When the call is connected, the box changes to indicate that the connection is made. When the other party hangs up, the box disappears.

As each of the network units reports its identity, location and status to the other participants' devices, the received data is geo-referenced and filed in their databases that are accessible by identity and by location. This data is then displayed. When a request for data is received, a location search is made and an indication of the closest track to the x, y position of the stylus is sent back to the display screen and software application code which causes another shape to appear around the unit and the data associated with the unit to be accessed. When the application code receives a soft switch command to place a phone call, the software uses the phone number (or IP address) associated with the unit to place the call or to send data.

If a device receives a digital message that a call is being received, the receiving unit's application code places a box or similar object around the transmitter symbol indicating who the call is from. When the call is answered, the application software changes the visual characteristics of the box. In a similar manner, when a phone receives a digital text message, photograph or video, a box appears around the transmitter's symbol indicating the transmitter of the message. The point to call network devices are participants and each one has a similar device with the same software for use as a total participant network. Other situations for calling facilities that are not part of the network are described below.

Fixed facilities' symbols selectively appear on the user's geo-referenced map display. The facility data can be accessed by identity and by location and type of facility. Device operators are provided the ability to call a facility (such as a restaurant, hotel, fire department, police station, military barracks, or other fixed entity) that appears on the map display. Each entity's phone numbers have been previously associated with that entity and stored in a facility database in the cell phone CPU that contains the identity, location and phone number of fixed entity locations that can be called. Data associated with the selected facility is obtained by the user using the stylus to touch at or near the facility map symbol's location. When a request for data is received by touching the stylus on a particular location, a location search is made and an indication of the closest facility to the x, y position is sent back to the display screen. The application code then causes a circle or other shape to appear around the facility symbol on the screen and its amplification data to appear. When the application code receives a soft switch (or hard switch) command to place a phone call, the software uses the phone number of the facility that was accessed to place the call to the facility. Thus, by using the stylus, the operator can touch a desired location on the screen such as "restaurant" and then use a soft or hard switch to initiate a telephone call directly to the restaurant without having to go to another type of display or without dialing the number.

The system shown in FIG. 1 can also initiate a telephone conference call for a small number of phones using stylus 14 contact to touch all the displayed symbols on display 16 that the initiator desires to conference and then selecting the "conference call" soft switch. The operator can also pre-establish a conference sub-net of selected participants that the operator desires to be able to rapidly call. The operator performs this task by touching the symbols or by selecting participants from a list or a matrix of the participant addresses and assigning the participants to a net software switch. When the operator desires to place a conference call to these participants, the operator simply touches the net soft switch associated with this group. Software is provided in the unit that mimics setting up a normal small conference call from "phone one" to each of the cellular phones or fixed facility phones the user had indicated by touching their symbols or selecting their sub-net soft switch on the screen. Once the first call is complete, the party will be automatically put on hold and other callers will be called or answered in sequence and put on hold until all the parties are on line at which time the conference call will be established. As each participant is called, the phone will, optionally, announce that a conference call requested by cellular phone "one" is in progress. This will all be done by the application software.

If a conference call is desired that includes more than a small number of phone users, the use of an 800 number conferencing service is required. The initiator or operator of cellular phone "one" would select the "conference 800" call software switch and then use the stylus or finger to touch the cellular phone users' symbols or select the net of the units to whom the calls are to be placed. For example, 50 users are desired on a conference call. The cellular phone "one" would send out a SMS, internet or WiFi message to all of the identified cellular phones that cell "one" requests each cellular phone participant to call an 800 number (the given number for a conference call) to conference with cellular phone "one". Each individual cellular phone user at that point in time would then be verbally notified that a conference call was requested. Automatically, or when the user selected the "accept" software switch, the phone would then call the 800 number and enter its conference participant code.

Thus, the operator device is capable of initiating a cellular phone call by touch only, and initiating conference calls by touching the geo-referenced map symbols. Furthermore, using a similar symbol touching technique cellular phone "one's" application code can send operator selected messages to cause a remote cellular phone to display and optionally announce emergency and other messages and to optionally elicit a response from the remote cellular phone.

The present cell phone/PDA/GPS device to create the communication network wherein all of the participants have the same communication device described herein also includes the ability of a specific operator device to provide polling in which other cellular phones using SMS, internet or WiFi report periodically based on criteria such as time, speed, distance traveled, or a combination of a time, speed and distance traveled. The operator can manually poll any or all of the cell phone devices that are used by all of the participants in the communication network having the same device as described herein for the invention. The receiving cellular phone application code responds to the polling device with the receiving cellular phone's location and status which could include battery level, GPS status, signal strength and entered track data. Optionally, the phone operators can set their phones to report automatically, based on time or distance traveled intervals or another criteria.

The application software includes an application for designating geo-referenced symbols by "hooking" them. The application software determines that the stylus is pointed close to or at the location of the symbol and puts a circle or other indication around the symbol indicating that amplification information concerning the hooked track is to be displayed and indicating that additional primary data and amplifying data is displayed. This indicates to the operator that a change in the data can be made to the indicated symbol. The operator can read the primary and amplification data. The operator can then select soft switches to change the primary data and amplification data or to take other actions that may include making cellular phone calls, conference calls, 800 number calls, sending a free text message or preformatted message, sending photographs or video to the hook symbol, going to the symbol's web site, automatically filling in the symbol's E-mail address in an E-mail or dropping the symbol. In operation, the application code detects the screen location of the touched point and determines if the distance from the touched point to the nearest symbol is indicative that the operator wants to "hook" the track. If the distance meets the preset constraints, the software places a "hook" indicator such as circle or square or other shape around the symbol and searches the database to find the information associated with the symbol. As each of the participants' network units or devices reports its identity, location and status, the data is filed into a database in the operator's device that is accessible by symbol location and identity.

With respect to hooking a fixed facility such as a restaurant, hotel, fire department, police station, military barrack, or other fixed entity, a database is created as part of the map creation process (or entered by the operator) that is used for the display screen. Optionally, the fixed facility database is contained in an on-line server. The database contains the identity, location, phone number and, if available, the E-mail, IP and URL address of the fixed locations. When a request for data from the operator is received by touching the display screen with the stylus, a location search is made and an indication of the closest facility of the indicated type to the x, y position is sent back to the display screen application code. The application code can then use the data to place a call, to send an E-mail, or to access data from the facility's website.

Another important feature using the present device allows an operator to enter on the cell phone device's geo-referenced map, a new entity or event that can include an observed object, person fire, accident or other event occurring now at a specific geographical location. The observed entity could be an event such as a fire or an explosion that requires notification to other participants. To enter the new entity (new track), the operator points and touches the appropriate location on his cellular phone/PDA's display's geo-reference map with the stylus. The operator then selects a soft switch that indicates the type of observed entity or event indicating, as an example, that the new event is a tank or a fire which causes the symbol to appear on the map representing the tank or fire. The computer application software computes the latitude and longitude of the entity and transmits the newly added symbol and its location to the other participants on the cellular phone, WiFi or by other communication device. Each participant in the communication network who has the cellular phone device, in accordance with the invention, receives the transmission message that identifies the type of new entity or track with a symbol and the current latitude and longitude of the new entity (symbol) and displays the symbol at the correct location. Furthermore, if it is desired to amplify the symbol with text or a photograph or video, the operator can enter the text, take a photograph or video of the object and attach it to the appropriate symbol. When transmitted, that data appears when the receiving cellular phone(s) and the operator(s) hook(s) the symbol. To accomplish this, the receiving phone(s) application code store(s) the track (new entity) symbol, its latitude and longitude and any amplification text, photographs or video in its database. The display application software accesses the new track from the database and converts the latitude and longitude to the display's proper x, y location and displays the track and symbol and amplification data.

Another important feature using the present device is that it can allow completely anonymous phone calling or digital communication where neither party knows the other party's phone number or name but where at least one party knows the other party's location. Calls are placed by hooking the symbol whose identifier (not necessarily the name or phone number) is known and selecting either the call, conference call, send free text, preformatted messages, photographs or video soft switch. The call or digital message is then sent to the server. Since the server receives each network identifier (its symbol's number) along with its dynamic IP address when they sign on, the server has the data necessary to send voice and digital data to that network participant. When the server receives a request to send voice or digital data to a symbol number and then an indication of the type of data to be sent VoIP for voice calls or conference calls, a digital message for free text, preformatted messages, photographs, or video, the server routes the VoIP or digital data to the net participant to whom it is addressed. Since both the transmitter and the receiver of the communications send data to and receive the data from the server and not from the sender, neither party knows the phone number or name of the other party. This same implementation can be utilized with standard (non-VoIP) voice calls. This is accomplished through the use of telephony interface cards at the server which permit the server to route the call to the addressee.

Figure 2:
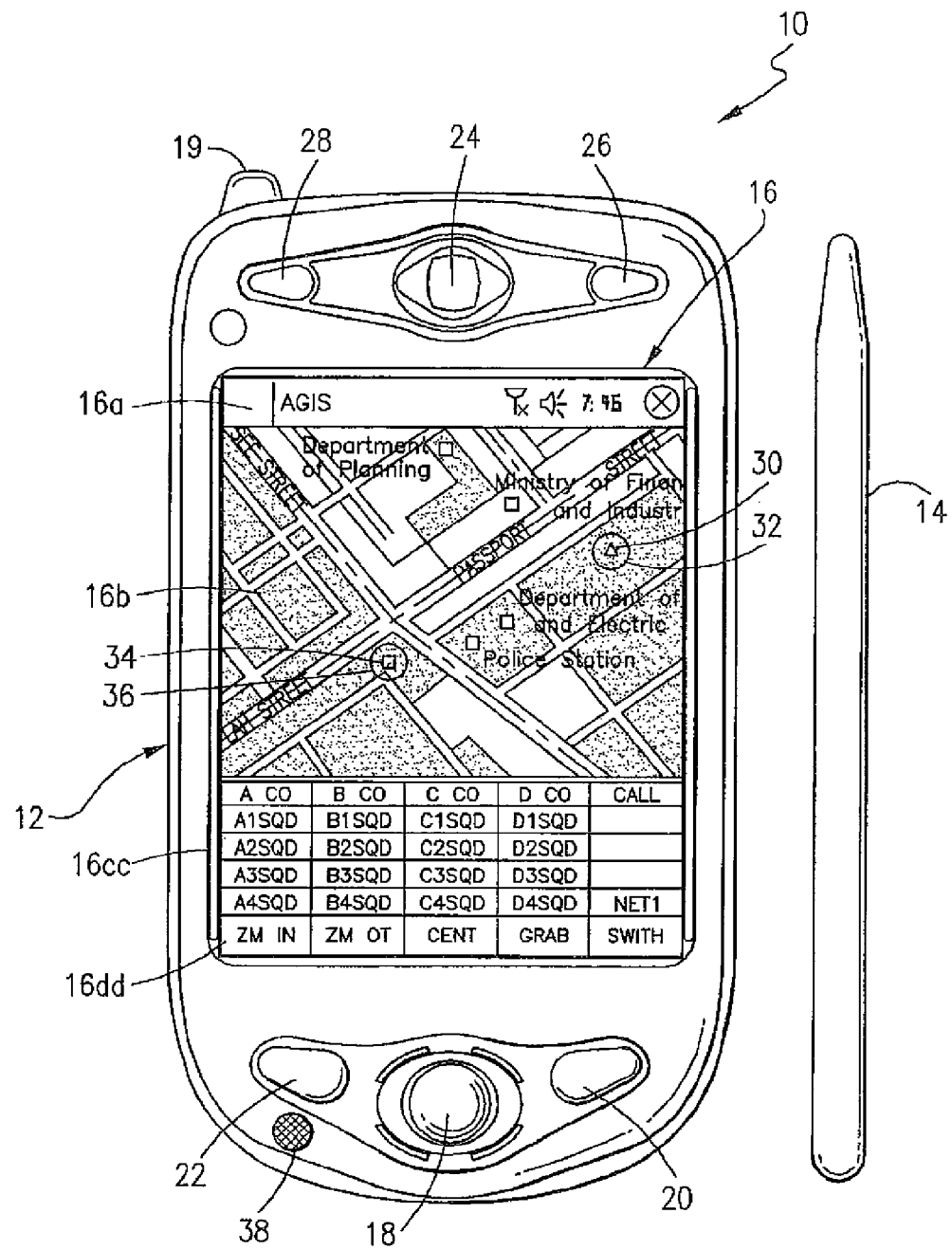
FIG. 2 shows a front plan view of the cellular phone/PDA of FIG. 1 with a different touch screen display.

Referring now to FIG. 2, the same cellular phone/PDA 10 is shown with the soft switch matrix displayed at 16cc and 16dd. The cellular phone/PDA is capable of an alternative method of contacting the participants. As shown in FIG. 2 and display 16cc, a plurality of squares is displayed having letters and numbers, each square of which indicates a different participant such as "A1SQD." Also, on the right hand side, top line is a switch option called "call." The bottom line 16dd shows ZM IN, ZM OUT, CENT, GRAB and SWIT. Using this alternative telephone method, the initiator can touch individual squares, each having a reference to a participant to initiate one call or a conference call with all of the parties. These can also be joined in a single NET 1 as shown. Subsequent phone calls with the particular designated parties or participants established with NET 1 can subsequently be initiated just by touching NET 1 with the stylus or with a finger. The displayed information can be layered with a plurality of 'NETS" on a next layer for contacting groups of participants in each NET. This is used in lieu of the screen symbols for conference calls.

Figure 3:
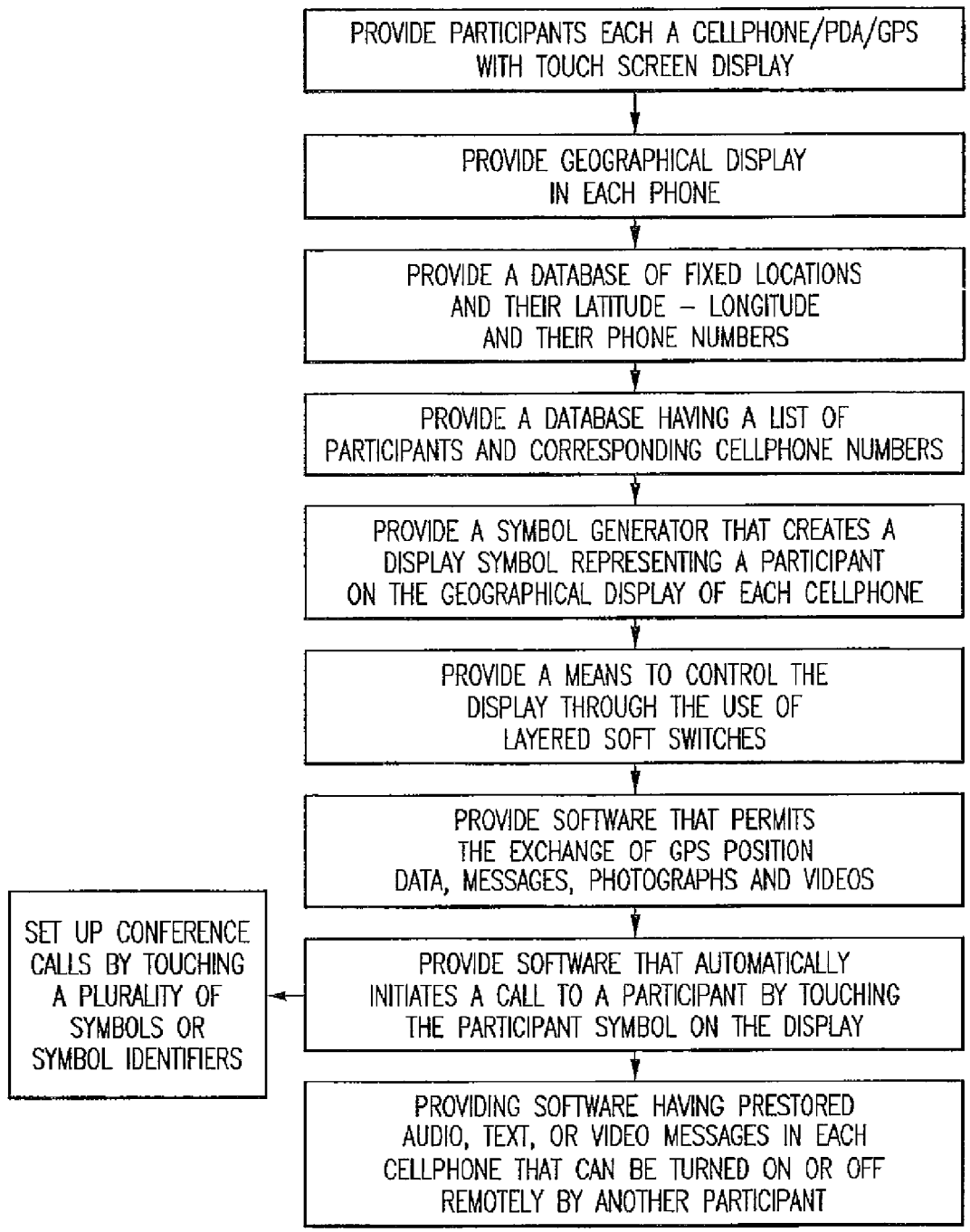
FIG. 3 shows a flow chart of the operation of the present invention.

Referring now to FIG. 3, a flow chart is shown of the activities provided by the present invention and the methodology.

In addition, the operator of cellular phone "one" can address text messages, photographs and video for transmission to one or more net participants by either touching their symbols and selecting the appropriate soft switch or selecting the appropriate call net.

Another important feature of the present invention is that the operator of cellular phone "one" can, by touching a switch on the display, send a digital message to all the PDA/cellular phones in the communications net or to designated cellular phone(s), represented by their symbols on the geographic displays, an emergency or other preformatted message which may or may not require a response and may or may not cause a verbal announcement, cause the phone to vibrate or buzz, or cause another alert. When received, the software in the remote cellular phone causes the remote cellular phone to initiate an audio or another alert to the cellular phone user that there is an emergency (or another message) and may or may not indicate that he should call the initiator immediately. This is accomplished by the message sent from cellular phone "one" to the software in the remote cellular phone(s).

In summary, the present invention provides for expeditious data exchange and cellular phone and WiFi calls to one or more users by merely touching the display screen location of a remote cellular phone user's symbol to initiate the call. The same pointing at geo-referenced symbols method is used to send free text, pre-formatted messages, photographs and video. Another method of establishing communications is to assign the participating user units to a net and then select the net to establish the call. Other features include conference calling by using a stylus or finger to sequentially hook symbols or select nets, to rapidly send emergency and other preformatted messages, and to cause remote phones to annunciate various pre-established messages, execute text to speech software, increase its volume level, vibrate, and show pre-entered photographs or videos. Furthermore, the cell phone/PDA operator can access fixed facilities' web sites or send them E-mail messages by using the same concept of hooking their geo-referenced map symbols and then using soft switches to automatically go to their web site or to automatically fill in their E-mail address in an e-mail.

Figure 4:
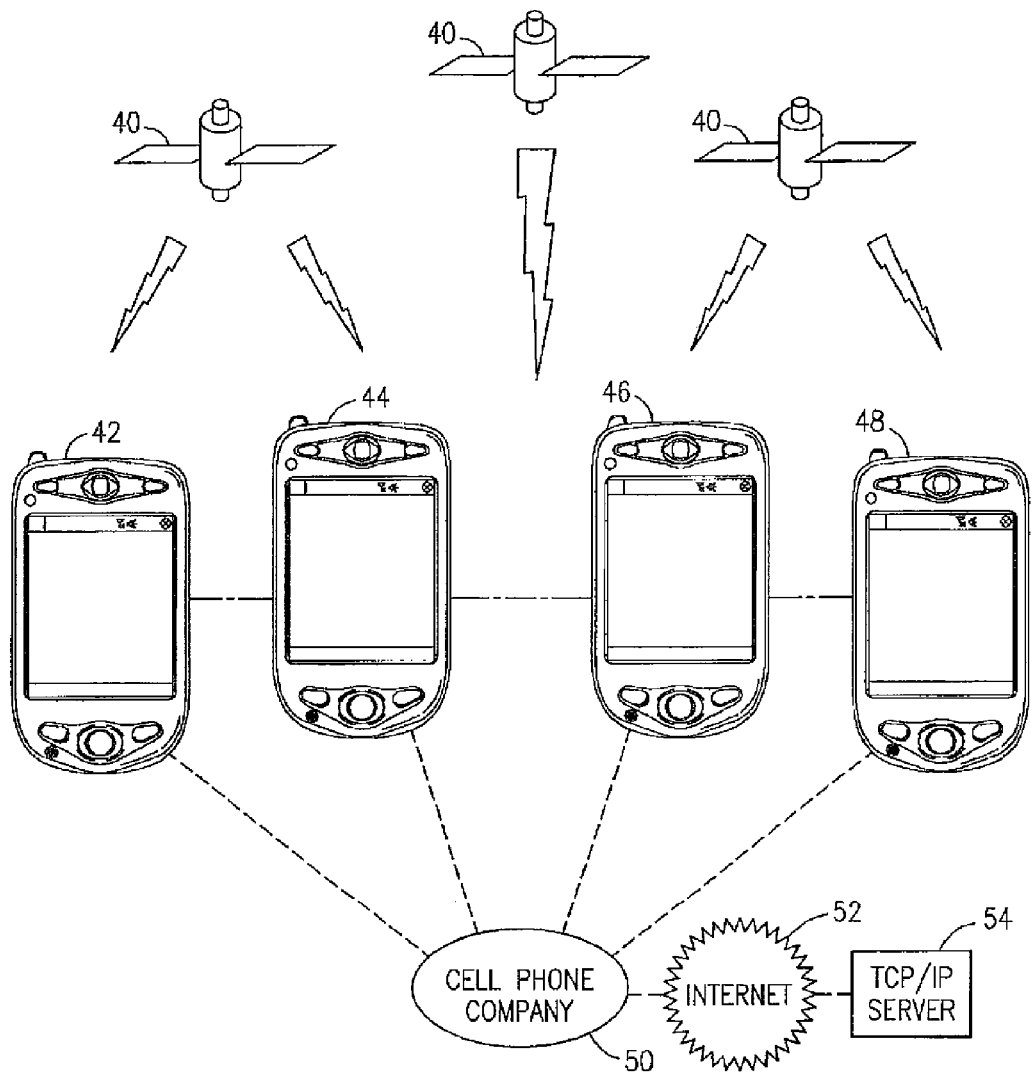
FIG. 4 shows a schematic diagram depicting GPS satellites, a plurality of cellular phone/PDA units, the cellular phone company, the internet and the command server that allows automatic shifting between high speed cellular internet communications and voice communications.

Referring now to FIG. 4, another embodiment of the invention permits automatic shifting between voice communications and high speed cellular internet communications across the communication network of cellular phone/PDA devices. In FIG. 4, information flow associated with the communications cellular phone system of the present invention is shown. The satellites 40 provide global positioning system (GPS) signals to each of the cellular phones 42, 44, 46 and 48 distributed throughout the communication area. Each of the cellular phones 42, 44, 46 and 48 automatically transmit each location data over the internet communications 52 that is provided by the cellular phone company 50. The data is sent to the command communication website server 54 which subsequently retransmits the data to all other common communication units or if specifically addressed data is received to the addressed specific communication unit such as cellular phones 42, 44, 46 and 48. If one of the cellular phone units, such as cellular phone 42 operator makes a voice call or is called, the system cellular phone automatically drops out of high speed data communications and goes to a slower Short Message Standard (SMS) communications mode which can be used simultaneously with voice communications. When this occurs, the other communication units 44, 46 and 48 detect the fact and transmit data to the communication unit that is in SMS using the SMS technology. When the voice communication is ended at cellular phone 42, then the cell phone again begins transmitting over the internet. The other cellular phones 44, 46 and 48 detect this fact and stop transmitting to it in SMS mode. Thus, automatic shifting from GPRS/EDGE/CDMA/1XEVDO/ to SMS occurs when the voice communication phone is in use and automatic shifting back to GPRS/EDGE/CDMA/1XEVDO occurs upon completion of the voice communication call. Another method for shifting between high speed and internet is as follows: If one of the cellular phone units, such as cellular phone 42 operator makes a voice call or is called, the system cellular phone automatically drops out of high speed data communications and goes to a SMS communications mode which can be used simultaneously with voice communications. However, instead of sending the SMS messages to the other participants, the phone transmits its data in SMS to the Server which then retransmits the data in GPRS/Edge/1XEVDO or WiFi to all the other participants. Location, status and text data from the other participants is then retransmitted by the Server to the phone in SMS. Photographs and Video Clip data is held by the Server for retransmission to the phone in SMS until the phone call is completed and the phone has returned to high speed GPRS/1XEVDO. When the phone call is completed, the phone returns to GPRS/EDGE/1XEVDO and that fact is detected by the Server which then reverts to high speed GPRS/EDGE/1XEVDO communications with the phone.

Figure 5:
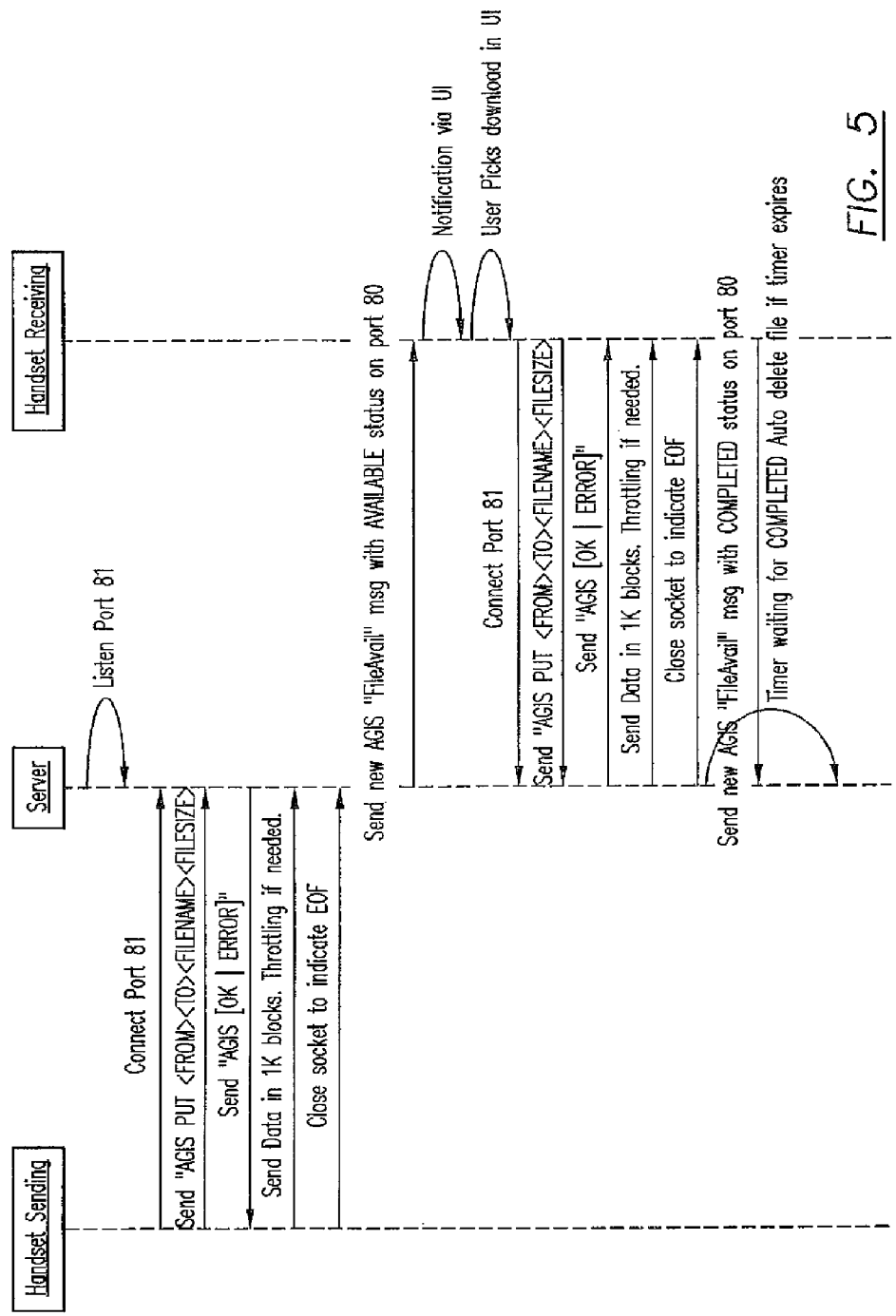
FIG. 5 shows a process flow diagram of the transfer protocol in accordance with the present invention.

Referring now to FIG. 5, which depicts a process flow diagram of the present invention transfer protocol that allows photographs and video transfer across multiple cellular carriers between smart phones and personal computers (PCs). In contrast to existing multimedia services offered by cellular carriers, the present invention functions across different cellular carriers including carriers using CDMA, GSM and WiFi. The primary key to the invention lies in the command Server which includes a collection of software applications and publicly visible IP addresses that can be accessed by internet capable mobile devices.

Specifically, the present invention transfer is comprised of several key concepts which include the use of a globally accessible Server to facilitate the transfer of photographs and video clips. The specification of a protocol uses distinct control and data ports that are capable of supporting multiple simultaneous transfers. This protocol can be implemented on a variety of intelligent phones and personal computers. As shown in FIG. 5, the hand set is sending to the command Server that listens for connect port 81. The data is sent in one K-blocks (which can be throttled if needed) and then closes the socket to indicate EOF. At the Server, available status is made on port 80 with notification via UL. User picks download in UL. The Server sends out the new command center file available message with available status on port 80. The hand set that is receiving provides notification back to the Server via UL and the user picks download in UL. The hand set receiving then connects to port 81. Once the hand set receiving is prepared, the data is sent in one K-blocks from the Server to the hand set receiving which is closed out to indicate EOF.

By the use of this protocol shown in FIG. 5, photographs, video clips, and video can be transferred between cell phones operated by different cell phone vendors in either CDMA, GSM or a combination of the two.

Figure 6:
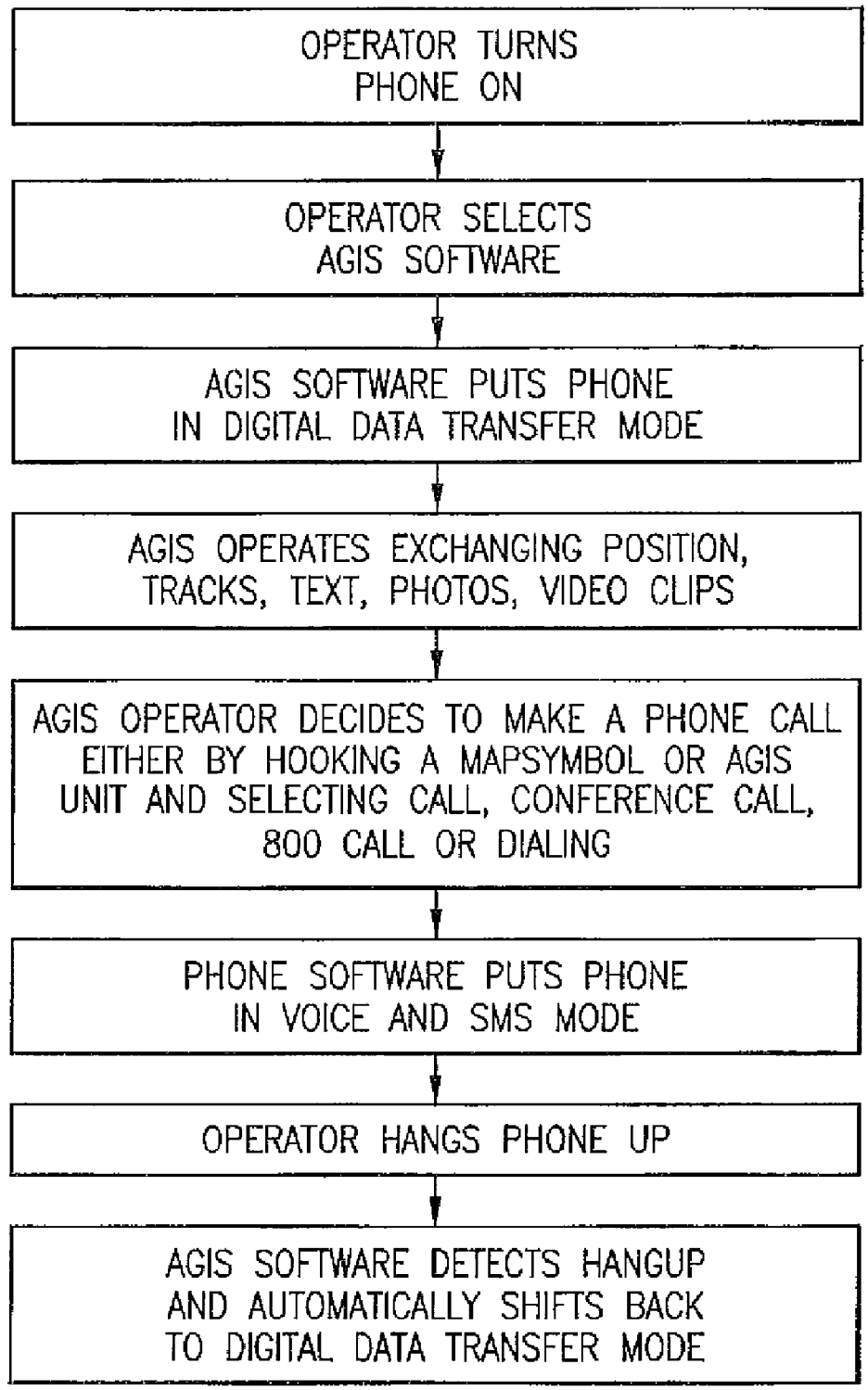
FIG. 6 shows a flow diagram for automatic shifting between voice and high speed cellular internet communications.

Referring now to FIG. 6, a flow chart shows how the device operator can switch between voice and SMS and high speed internet data transfer. As shown in FIG. 6, the operator turns the cellular phone on and selects the application software. The application software puts the telephone in a digital data transfer mode. The software operates exchanging position, tracks, text, photographs and video clips. The operator then decides to make a voice telephone call either by hooking a participant unit cellular phones' symbol or a fixed facility symbol and selecting the voice call, conference call, or 800 call soft switch. The application software then puts the phone in voice and SMS mode for that voice call. When the voice transmission is finished, the operator hangs the telephone up. The application software detects the hang up and automatically shifts back to the digital data transfer mode.

The invention also allows an operator to assign text, photographs, or a video to a map symbol that is displayed on the navigation map display. When the operator enters text, takes a photograph or takes a video clip, the operator can then touch the map symbol with which the operator wants to associate the map symbol with the text, photograph or video clip. A soft switch is selected to associate the text, photograph or video. The symbol to which the text, photograph or video clips are assigned, can be moving or stationary. Subsequently, if any other users on the cellular phone network or the operator touches i.e. "hooks" the symbol, the text, photograph or video will be displayed. This is a very important feature in that instead of a participant looking at what would be a symbolic display of, for example, an enemy tank, the sending and receiving participants are able to hook the symbol, view an actual photograph or video of the stationary or moving tank.

The touch screen display includes an activating switch that, when touched, causes a matrix of software driven layered switches (soft switches) to appear on the cellular phone/PDA display in place of the readout and insert areas. Some of these soft switches, when touched, cause the cell phone/PDA device's functions to occur. Other soft switches cause yet another layer of soft switches to appear, replacing those that were previously displayed. The operator is provided a visual display indicating the specific layer in use from the layers of switches, and is able to return to the previous layer or to cause the layered switches to disappear such that only the basic switches remain. The operator can also use the cell phone's hardware pointing device (navigation pad) to control the soft switches. By using these soft switches and hard switches that are part of the cellular phone, the operator can activate different maps, change map scales, select which fixed entities are desired to be displayed, display the information concerning the symbol the operator has touched, initiate phone voice calls, send messages (free text, preformatted messages, photographs and videos), enter symbols and information representative of other entities, view the locations and statuses of the other communications net participants, establish conference calls, and pre-establish conference sub-nets. The conference sub-nets, when activated, cause all the phone numbers that are specified to be conferenced for voice, text, preformatted messages, photograph and video communications, and transmit messages to remote phones which cause the remote phones to make calls, verbal announcements, vibrate, increase sound levels and other functions. The operator can also use the soft switches to cause the cell phone/PDA or if embodied in a cellular or WiFi enabled personal computer or tablet to automatically access "hooked" fixed facility web sites and to automatically addresses E-mails.

The soft switch application software causes a visual display of a matrix such as five across by six up (or other matrix) in which switch names are placed on the cellular PDA display. The soft switch application software knows the touch screen location of each of the switches in the matrix and the software routines that will be activated upon touching the switch.

The bottom row of soft switches displayed on the touch screen remains visually fixed. These switches concern the functions that are the most often used. One of the switches causes a matrix of other soft switches to appear above the visually fixed soft switches. These switches are function soft switches, the activation of any one of which causes a different matrix of soft switches to appear, which are known as the action soft switches. When the action soft switches appear, the function soft switch which causes the action soft switches to appear as a label in the lower left (or some other standard location) indicating to the operator the types of actions the operator can take. When the operator selects an action soft switch, the appropriate application software to accomplish the action is activated.

Upon receiving a soft switch activation message, the software accesses the appropriate task execution software which accomplishes the required tasks including enter track data, enter track amplification data, send alpha/numeric messages, send photographs, send video, read messages, select map types, voice call, conference call, 800 call, set up selections, display actions, polling units, set up nets such as groups of users or locations, and drop track. By providing a matrix and layers of soft switches which are easily manipulated by a stylus, each cell phone device in the communication network is extremely efficient in accessing and coordinating the appropriate application program for the device to perform.

There are several ways that the network can be established including: A. POLLING—To initialize the communications net, the cellular phone "one" operator selects, from a list, the other users (or all of them), that the operator desires to be part of the communications net. The system then polls the selected phones to activate and become part of the communications net. The selected phones then transmit their GPS positions to all the other phones in the established net. Through interaction with one or more other software enabled cellular phones, symbols are generated on the operators' displays based on the participants' latitude and longitude that is exchanged between the cellular phones. The transmission of this information is based on an algorithm which considers time and/or movement or which is based upon a polling request. B. ALL REPORT—Another method is for each cell phone sets its own transmission times based on time or movement. When its initial message is received by the other participants they report their location and any tracks that they have entered. C. GROUP—IDENTIFIER BY TYPE—Another method is for each phone to have a group identification that is transmitted in its initial message which relates it to a particular group who are their own net, only those with that identifier (i.e. singles, coin collectors, etc.) are permitted to join that net, and yet another method. D. FRIENDS AND FAMILY—Only those who are in an approved list maintained by the server or internal to each phone are permitted to join that network.

Each of the communication net symbols on the display represents a different cellular phone remote from cellular phone "one". Each of the cellular phones has the phone numbers of all the phones that it expects to exchange data with in its database. If additional phones desire to join the net, they transmit their designation and their phone number in their initial message so that they can be identified. The net can be set to either enable these phones to join the net or to be set to exclude them from the net. Each of the phones also has in its database the pre-established phone numbers and, if available, the E-mail addresses and URLs for the fixed locations buildings, facilities, military bases, and other desired locations that can be called or accessed in its database. The touch screen provided with the LCD display in the cellular phone includes x, y coordinates that are correlated with the geo-referenced map on the cellular phone display and the geographic location of the fixed sites and the cellular phones participants in the communications net. The operator of each cellular phone can enter an object of interest by touching the display screen at the object's location on the display screen map. The operator can then assign each object a category (car, person, tank, accident, or other category) and amplification data including: text, photographs and video. The latitude and longitude of each object along with its category and other information is then sent on the communications network. Because each of the receiving cellular phone/PDA devices has software that automatically converts the received data to the correct map location, the transmitted symbols appear at the correct location without operator intervention and their category information and amplification information is available by touching the symbol on the display screen.

Each cellular phone/PDA/GPS device contains the communications hardware, along with the circuitry and software, to initiate a voice telephone call or transmit data messages, photographs, or videos by an operator touching the display screen with a stylus or finger at the symbol location displayed on the screen of the desired cell phone net participant to be called and then selecting the: "call", "free text", "preformatted message", "photograph" or "video" software switch on the display touch screen. The call is then done automatically. Each of the fixed facilities can be called in a similar manner; however, since the fixed facilities' phones are not one of the participating phone devices, they do not have the application code; thus "free text", "preformatted message", "photograph" or "video" type data can not be sent. The software will then cause the participant cellular phone to call or send the appropriate data to the specific phone number represented by the symbol on the screen. This action alleviates completely the steps of looking up a phone number and manually entering the phone number required or IP address to make a cellular phone call or a WiFi, VoIP call, or to send data. Each cell phone device can use software for VoIP calls. The database in the cellular phone/PDA devices includes the phone numbers of each the other network participant symbols and, if available, the E-mail and URL address of each fixed facility on the map. The fixed facility E-mail and URL address enable the operator to go to the fixed facilities' web sites or to automatically fill in their E-mail addresses by hooking the fixed site's symbol and selecting the appropriate soft switch.

Using the application software on a cellular phone/PDA device in accordance with the present invention, permits the cellular phone user to enter and transmit data such as text, preformatted messages, photographs or video clips associated with a symbol on the geo-referenced map display and to then transmit the data associated with the symbol to other net participants automatically or by hooking the symbol and selecting transmit. The touch screen symbol can be stationary or moving. When the receiving participant points at the symbol, the symbol is hooked. The associated data (text, preformatted message, photographs or video clips) that was entered by the participant and transmitted will appear on a portion or on the whole touch screen of the receiving participant's display. Thus, if the operator of a cell phone device were in a situation where the operator observed a moving target, such as a tank, that had a symbol representative of a target on the operator screen, the operator can enter the text data or preformatted message, a photograph of the actual tank that is being observed, or a video clip of the actual tank that is being observed, which can all be transmitted rapidly to a recipient participant involved in the entire situation. Thus, when the recipient participant hooks the symbol he can view the free text, preformatted message, photograph or video of the actual target that has been sent by the operator. In this case, the cell phone software program generates the moving symbol and stores the entered text message or has a selected preformatted message stored, or captures and stores the photographs or video clips using a video camera into memory, and associates the entered data with the symbol that was generated that represents the moving target and transmits the data to one or more participants of the net.

Another embodiment of the present invention provides for full transfer of photographs, video clips, and high speed data between any cellular phone vendors in either CDMA, GSM, WiFi or a combination of these. Thus, using the present invention, photographs and video can be transferred across multiple cellular carriers between smart phones and personal computers. This is accomplished by a command server which includes a collection of machines publicly visible IP addresses which can be accessed by internet capable mobile devices. With the present invention, there is the use of a globally accessible server to facilitate the transfer of photographs and video clips between each of the cellular phone users in the communication network. The method and communication network also includes the specification of a protocol that uses distinct control and data ports capable of supporting multiple simultaneous transfers. This protocol is implemented on a variety of intelligent phones and personal computers.

The software in the present communication device can provide to each user participating with the same software the ability to make voice calls and to send free text, operator selected messages, photographs, and video to all other user participants within a certain distance to be determined by the initiator of the call or data. The software enables the initiating user to indicate the farthest recipient within the geographical range to whom the initiating user wants to call, and to send free text, operator selected preformatted messages, photographs or video, by selecting an appropriate soft switch. The initiating user's device will then call or transmit the free text, operator selected preformatted message, photograph or video to the farthest participant in the selected range and all other participants that are closer. This is similar to the conference voice call discussed above but, in this particular software managed situation, all of the parties, from the farthest to the nearest, within that range can receive the same call, free text message, operator selected preformatted message, photograph and video. Again, this action is a tremendous time saver for the initiating user to get these types of messages to all of the participants within a given range. The operator "hooks" a track that is stationary or moving and selects a soft switch specifying that the operator desires to conference call all network participants or to send free text, operator selected preformatted message, photographs or video that are the same distance or closer than the range of the hooked track. The application software then searches the geo-referenced database (containing latitude and longitude or similar positional attribute) for all the network participants within the specified range. Upon finding them, the application software: (1) sends a message to the cell phone to call or conference call the identified participant's network, (If the number of participants is greater than the number permitted by the phone's conferencing capability, the application software instructs the phone to make a call to an 800 number and cause all of the other phones to make a similar call and to automatically enter their participant code) or (2) sends a free text message, an operator selected preformatted message, a photograph or a video to all the participants within the specified range. The operator can use the same technique to call fixed facilities, but because the fixed facilities do not have the application software, the operator can not send text, preformatted messages, photographs or videos.

The present invention includes other features for a cellular telephone communications device that provides calling all other people on the communications network that have a specific attribute such as all of the squad leaders within a company or all the company commanders within a battalion. Also, the device will notify one or more of the users within a variable range when someone else using the software approaches and provides for automatic calling within a specified range of a particular user's cellular phone.

Another feature of the present communication system is to enable the cellular user to use a Smart Phone or a personal computer such as a desktop, a laptop computer or a tablet computer that is equipped with a CDMA, GSM cellular telephone or WiFi card, a global positioning system (GPS) receiver and a digital camera that can accomplish all of the communications that have been described in the application. Thus, the PDA software provided for this communication system is readily adaptable into a personal computer, laptop computer or tablet along with a digital camera and GPS once the cellular telephone or WiFi card is installed in the system. The present communication system is also capable, based on the software and hardware of the present invention, of using wireless communications (WiFi) in lieu of the cellular communications that have been described herein. The system can use an integrated wireless capability or a wireless card that allows transmission and receipt of wireless communications in accordance with any conventional wireless protocol.

Automatic Identification System (AIS) is a communication system that is used between ships for identifying the name, position, heading, and velocity of nearby ships. Each ship has its own display and receives constant signals from all the other ships within line of sight. The AIS constantly transmits updates of each ship's current location, course and speed and other pertinent data within line of sight. The AIS reports are transmitted at a variable rate. With the software in the present communication system, a remote server receives, processes and correlates the AIS reports. The server then transmits the AIS ship locations to all the cellular/PDA phones (and PC/tablets) that are network participants. Each network participant is able to view the location of all of the other participants in the net and to also view the location of the AIS equipped ships on each participant's display. Furthermore, the AIS data content (ship name and other data) of the AIS reports are displayed when the AIS symbol is hooked on a participant's cell phone/PDA display. The server application code receives the AIS digital message, determines the type of AIS message and processes the data appropriately, storing the AIS data into a database organized by MMSI number or another unique AIS ship identification means. The AIS data is then retrieved from the database using one of several criteria including the: (a) time since last transmitted and (b) speed of the ship. The retrieved AIS data is then processed by a transmission routine which transforms the data into a format that is compatible with the cellular Internet transmission means or SMS or WiFi and outputs the data to net participant cellular phones/PDA (and PC/Tablets) at the correct latitude and longitude. The AIS cellular phone/PDA (and PC/Tablet) application software receives the server formatted AIS data and stores the data in a database. The data associated with each AIS track is then retrieved from the database by the cell phone device display software and transformed to the correct x, y display position to correspond to each track's latitude and longitude. When the track is hooked, the AIS amplification data, or a subset of it, is displayed to the user.

The software program contained in the cellular phone/PDA using the present invention can generate a display indication of a symbol's speed and heading. The speed and heading are indicated by a small line attached to the symbol. The line's direction indicates the symbol's heading and line's length indicates the symbol's speed. When the cell phone generated symbol's speed and heading are transmitted, the receiving participant's device also displays the speed and heading in the same manner. When the user notices that a track has moved from the location that the user first observed, the user can point by touch screen to the display location where the track has moved to on his cellular/PDA display. This new location data is then converted to the appropriate latitude and longitude. The velocity generation application code then computes the speed and heading, taking into account the time interval between the time the track's previous position was entered and the time that the new location was entered. The velocity generation application code then passes the velocity (heading and speed) to the display generation code. When the display generation application code receives the speed and heading data from the velocity generation application code, the display generation code attaches a line to the symbol. The line's length indicates the track's speed and the line's direction indicates the track's heading.

The cell phone/PDA map display in accordance with the map software program provides a geophysical display using a geo-referenced map, chart, satellite image or aerial photograph of a given area or location. This map can be based upon and received from the worldwide databases that are maintained by the U.S. Government and others and loaded on to the cellular phone CPU database. The cell phone device application software, however, can also provide to a user the ability to request a specific geo-referenced map or chart, aerial photograph or satellite image from a remote image server by pointing at the specific location desired for the map, aerial photograph or satellite image and selecting the display range and selecting the request image soft switch. Activation of the request soft switch causes a message to be sent to the remote server that causes a geo-referenced chart, map, aerial photograph or satellite image to be sent to the requestor's cell phone/PDA device where the image is geo-referenced and displayed.

Another feature of the present communication system is to provide to each user's cell phone device geographic notification on the touch screen display of the location of the sender of a message to the user. With two or more of the cellular phone/PDA devices in the network, a message recipient can hear an audible voice alert, or beep or tone that alerts the participating recipient to an incoming message. The additional feature is that a different color box or circle will appear around the symbol on the geographic display that represents the participating sender of the incoming message. Thus, the participating recipient is immediately apprised of the specific location and, thus the importance, of the party who is calling or transmitting a message to the recipient. In the case of a battle or disaster scenario, it could be that the geographical display screen will shown an incoming message from someone who is right along the forward battle line or in an area of a recent disaster. This will tell the recipient to immediately read the message. The recipient can either select the read message soft switch and then select the message from the message list or hook the indicated symbol to display the message whether it is text, preformatted message, photographs, or video. Thus, the internal software program in each cell phone device can alert the recipient that a message is being received and the location of the sender on the display by a color or other type of indicia surrounding the symbol that represents the message sender for rapid notification to the recipient of who is sending the message.

The present cell phone/PDA devices used in the communication network system can provide to each user the ability to cause a text, preformatted message, photograph, video clip and high speed data to be "pushed" to other participants' cell phones so that the data sent does not have to go to a website to pull off the photograph or video clips.

Another feature of the cell phone device used in the present communication system is to provide to each user the ability to go to a fixed faculty's web site (such as a restaurant) by hooking fixed site's symbol (and thus obtaining its URL) and selecting a soft switch that requests that specific web site. This same feature can be used to automatically address E-mails by hooking a fixed site's symbol (and thus obtaining their E-mail address) and selecting a soft switch that requests an E-mail form and automatically fills in the fixed site's E-mail address.

The software with the present communication system provides to each user the ability to cause an alert (verbal, vibrate, or text) to emanate from or appear on the user's display when another user is within a predetermined distance of the user and, furthermore, to be able to automatically call that individual by selecting the call soft switch.

The cellular phone/PDA device can provide the user with the ability to select a soft switch that causes the cell phone to call the geographically nearest member of a particular group of members such as the nearest police station, fire station, EMT unit, or other member that can include services such as plumbers or electricians. The software can be set up so that the cellular phone/PDA's software searches the database to find the nearest geographic police station or fire station, or whatever the selected group is, and would automatically make a cell phone call to that number. The GPS application software is constantly updating the database with the GPS location of the user which is then superimposed on the display map. Fixed facility locations of interest to the user are stored in a non-network facility location database along with their phone numbers and, if available, their email addresses and their URLs. These groups and member locations include types of facilities such as: restaurants, police stations, fire departments, gas stations, restaurants and military installations. When the operator selects to call the nearest facility location, the position application software searches the non-network fixed facility database to determine the closest facility of the type that the operator has selected. When the nearest facility of interest is found, the position application software sends a message containing the nearest facility's phone number, (and if available URL and E-mail address) to the application software. When the application software receives the nearest location of interest, the software places a modifier around the symbol that is associated with the location of interest and places the call or if different soft switches have been selected goes to their web site or automatically addresses an E-mail.

The data link application software is constantly updating the database with information concerning the position, identity and status information of the network participants' devices in each cell phone CPU transmitting on the cellular, WiFi or SMS network. Tracks that are entered are being constantly repositioned as the tracks move. The database is constantly sending the cell phone device and track data to the display database so that the display can be updated with new device positions and track data received from the participants in the network. The position application software computes the range from the user to the other network participants and tracks "entities" received from the other net participants and creates an alert if the range is less than the range specified by the operator as the notification range. When the alert is created, the alert is sent to the display and voice announcement application code. When the display application code receives the alert, the code then posts a visual indication such as a modifier around or near the cell phone device or track that is within range. When the voice alert application code receives the alert, the code either accesses a prerecorded voice announcement or utilizes a speech to text software application to make a verbal announcement.

The instant invention has been shown and described herein in what is considered to be the most practical and preferred embodiment. It is recognized, however, that departures may be made there from within the scope of the invention and that obvious modifications will occur to a person skilled in the art.

What is claimed is:

1. A method of expediting a cellular phone voice call over a cellular phone telephone network using a PDA cellular phone that includes soft switches and a touch screen visual display for calling a fixed location including individually but not limited to a restaurant, police station, and fire station having a conventional telephone, displayed symbolically on a geographical map on said display, said fixed location having a telephone and said fixed location being displayed on said geographical map on the cell phone touch screen display comprising:

displaying on a touch screen a geographical area on a map that includes at least one fixed location at its longitude and latitude on said map on the PDA cellular phone with a database and application program for displaying a selected geographical area on a map or chart on the touch screen display that includes at least one fixed location at its latitude and longitude on said map or chart;

providing the cellular phone with a database containing the telephone number of said fixed location displayed on said geographical map or chart;

initiating a voice call using the PDA cellular phone with a database and an application program to said fixed location upon touching the touch screen display including the geographical area on the map at the equivalent latitude and longitude location of said fixed location;

retrieving the stored telephone number of said fixed location upon initiating said telephone call by touching said fixed location on said display;

entering a new entity on the display geo-reference map including an observed object at a specific geographical location by touching the appropriate location on the map display screen;

selecting a soft switch to indicate the type of entity observed causing a symbol to appear on the map screen;

executing a call switch to turn on said cellular phone internal software to begin calling said fixed location;

displaying a call in progress symbol on said touch screen display when said telephone call to said fixed location is in progress; and displaying a second different symbol on said touch screen display indicating that the telephone call to said fixed location has been established.

2. A method as in claim 1, providing a database in said cell phone PDA that includes the E-mail address of said fixed location;

addressing an E-mail of entered free text or a pre-selected message to said fixed location by touching the symbol of said fixed location on said map or chart displayed on said visual display; and sending the E-mail by selecting the send or transmit switch.

3. A method as in claim 1, providing a database in said cell phone PDA that includes the web site address of said fixed location;

going to the web site of said fixed location by touching the symbol of said fixed location on said map or chart on a soft or hard switch that indicates to go to that symbol's web site.

4. A method of expediting a cellular phone call to a fixed location as in claim 1 including the step of:

executing a conference call with said fixed location(s) telephone.

5. A communication system as in claim 1 capable of using CDMA, GSM or WiFi in operation; and said cell phone PDA operating communication units in the network including: smart phones, personal computers (PC), laptop or tablet computers having a telephone.

6. A method as in claim 1, including:

providing a command server with a collection of names, telephone numbers and IP addresses that can be assessed by internet capable, mobile devices.

7. A method of providing a cellular phone with a screen display the ability to request geo-referenced maps, images or data concerning an area as in claim 1 including the steps of:

providing a remote server having geo-referenced maps, images or data concerning a geographical area;

providing the operator the ability to request geo-referenced data for an area by pointing at the center of the area for the requested information, then selecting a range scale and then taking an action to request the data from said remote server where the data is held; and downloading said geo-referenced maps, images or data upon request by a cellular phone operator to said operator's cell phone screen display.

* * * * *